March 4, 1969  J. J. LOHR  3,430,902
VARIABLE STIFFNESS POLYMERIC DAMPER
Filed May 11, 1967  Sheet 1 of 4

INVENTOR.
JEROME J. LOHR
BY
ATTORNEYS

United States Patent Office 3,430,902
Patented Mar. 4, 1969

3,430,902
VARIABLE STIFFNESS POLYMERIC DAMPER
Jerome J. Lohr, Saratoga, Calif., assignor to the United States of America as represented by the Administrator of the National Aeronautics and Space Administration
Filed May 11, 1967, Ser. No. 638,707
U.S. Cl. 248—18    6 Claims
Int. Cl. F16m 1/00

ABSTRACT OF THE DISCLOSURE

A vibration damping device comprising a solid, high-molecular-weight, substantially amorphous polymer which is utilized at a temperature within the region of the glass transition temperature thereof. The polymer changes from a hard, substantially rigid condition at a temperature below the polymer's glass transition temperature to a viscous condition at a temperature in the region of the glass transition temperature. In the viscous condition the polymer comprises an efficient and reliable vibration damper. When the ambient temperature is below the glass temperature, means are provided for heating the polymer to the glass temperature region. The heating means may be employed for heating the polymer to above the glass transition temperature to return the polymer to its original shape, if a polymer with a built-in memory is employed. Also, by using the polymer in the temperature range just below the glass temperature the damping increases with an increase in temperature thereby providing an added safety factor.

---

The invention described herein was made by an employee of the United States Government and may be manufactured and used by or for the Government for governmental purposes without the payment of any royalties thereon or therefor.

This invention relates to a variable vibration damping device which utilizes a solid high-molecular-weight substantally amorphous polymer member to absorb mechanical energy. The mechanical properties and damping characteristics of said polymer member are highly temperature dependent. Temperature control of the polymer member is employed to vary the damping capability of the device. Maximum damping is achieved when the polymer member is at its glass transition temperature.

Vibration or shock damping mechanisms are used for the isolation of a device from motion of a support or for isolation of the support from motion of the device. Obviously, such mechanisms find a wide range of uses. For example, space vehicles are often exposed to extreme shock and vibration, typical sources of shock and vibration being booster ignition and burning, retro-rocket firing, docking maneuvers, planetary impact, and the like. The effects of these environmental parameters are often accentuated by the design configuration and weight limitation. For example, solar cell panels, which must be lightweight, easily deployable, and suitably isolated from the space vehicle base, may have panel-tip vibration amplitude gains of 50 times the input at the spacecraft base. Without suitable shock absorbing mountings, those gains could result in structural failure during a mission. Also, planetary impact, whether soft or hard, imposes severe restraints on the design of instruments which must be capable of withstanding impact decelerations. The vibration and shock attenuating mechanism of this invention is well adapted for decreasing the stress on such system components.

An object of this invention is the provision of a shock and vibration damping mechanism which is reliable and has high-energy-absorbing characteristics relative to the weight thereof.

An object of this invention is the provision of a shock absorbing device in which the damping capability increases, rather than decreases, with an increase in temperature of the device.

An object of this invention is the provision of a vibration damping device having means for readily varying the stiffness and resonant frequency of the device by simply controlling the temperature thereof.

These and other objects and advantages of the invention are obtained by means of a vibration damper comprising a solid, substantially amorphous, high-molecular-weight polymer operated in the glass transition temperature reigon. This region is a temperature range within which amorphous polymers change from a relatively stiff material to a relatively soft, viscous, material, the temperature at which such change takes place being termed the glass transition temperature, designated $T_g$. In the region of the glass transition temperature, the damping capability of such polymers increases by an order of magnitude. If this temperature is above the ambient temperature, the device may be heated for operation in the glass transition temperature region. By simply controlling the heat to the device for control of the temperature thereof the damping capacity and resonance of the device are readily controlled. Also, by using the polymer in the temperature range directly below the glass temperature, the device increases in damping capability with an increase in temperature.

The invention will be better understood from the following description when taken in conjunction with the accompanying drawings. In the drawings, wherein like reference characters refer to the same parts in the several views.

Figure 1:
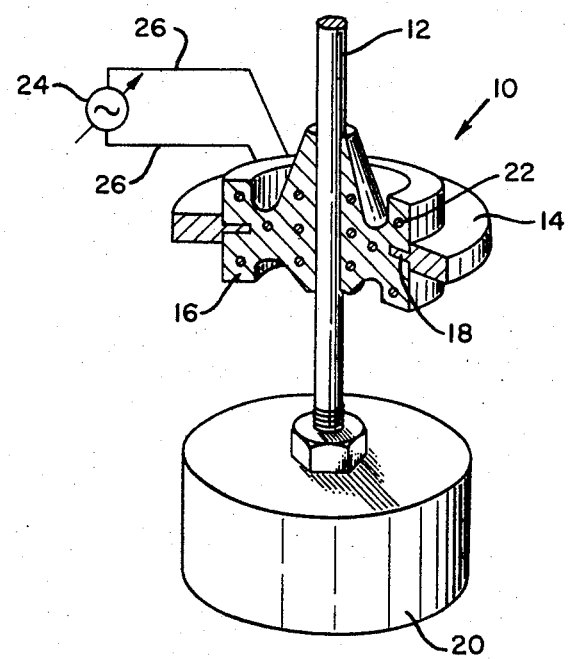
FIGURE 1 is a perspective view of a vibration and shocking damping device embodying this invention, a portion of which device is shown broken away for clarity.

Reference is now made to FIGURE 1 of the drawings wherein there is shown a vibration damping device 10 comprising a center supporting rod, or stud 12, and an annular mounting disc 14. The stud and disc are interconnected by a damping member 16 which, in accordance with this invention, comprises a substantially amorphous high-molecular-weight polymer adapted for operation in the region of the glass temperature. The configuration of the components 12, 14 and 16 and the arrangement thereof may be of any well-known design. For example, the damping member 16 is shown formed with a central aperture through which the rod 12 extends, with the rod being bonded or attached to the damping member by any suitable means, not shown. A radial flange 18 is shown formed on the outer disc 14 which extends into an annular groove in the damping member 16 for connection of the disc to the member. Obviously, other configurations are possible.

The rod 12 and disc 14 are used to connect a body 20 to a support, not shown, for isolation of the body from the support; the function of the damping device 10 being to isolate the body from motion of the support, or to isolate the support from motion of the body.

Numerous polymers which are totally or largely amorphous and which change from a relatively stiff to a relatively soft material in the glass temperature region are well known and include poly(methyl methacrylate) (PMMA), polyethylene terephthalate (Mylar), polystyrene (PS), polyvinyl chloride (PVC), and the like. The invention is not limited to any particular polymer. The invention is applicable to many other materials which contain long chain molecules. These long chain molecules may be composed of repeating units based on carbon-carbon bonds, carbon-silicon bonds, carbon-silicon-oxygen bonds, or similar structures. Typical examples of such materials are thermosetting polymers, natural and synthetic rubbers, natural resins, asphalt and coal tar. The term plastic is used herein to identify such synthetic and natural materials.

If the device is to be used in an environment in which the ambient temperature is below the glass transition region of the polymer, heating means are required to raise the polymer to the glass transition temperature. In FIGURE 1 there is shown a heating element or wire 22 in the form of a coil embedded in the polymer, and connected to a variable voltage source 24 through lead wires 26, the connection of the wires 26 to the heating coil 22 not being shown. Alternatively, the heating coil or coils could be positioned adjacent to or on the polymer damping material 16 rather than embedded therein. Also, tubes or conduits for the flow of a heating fluid could be used in place of the electrical heating elements 22 if desired. The invention is not limited to any particular type, or types, of heating means which may be employed to raise the temperature of the damping material to the glass temperature region.

Figure 2:
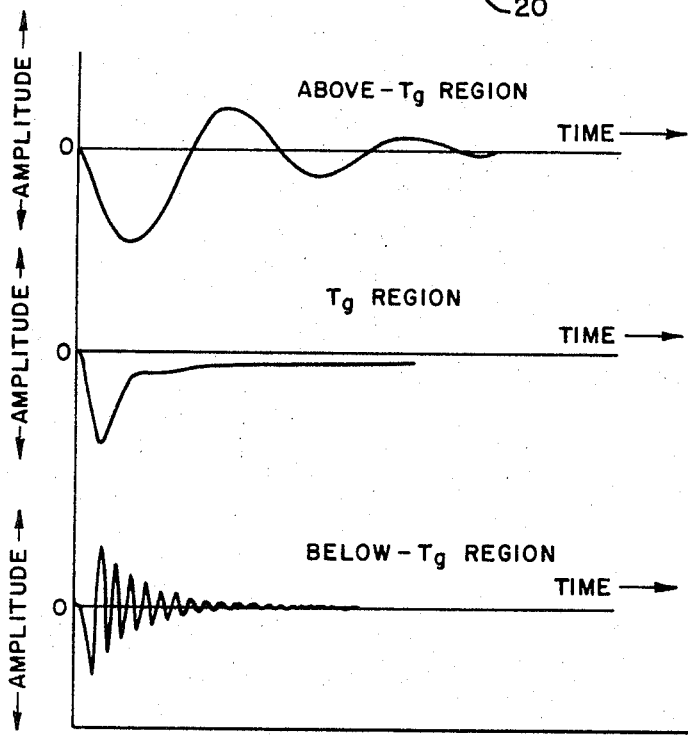
FIGURE 2 shows free-vibration curves for a typical amorphous polymer at temperatures above, below and within the glass temperature region of the polymer.

The increased damping which occurs in the range of the glass transition temperature, $T_g$, may be seen from an examination of FIGURE 2 in which free-vibration curves for poly(methyl methacrylate) (PMMA) are shown. The lower curve, labelled "Below-$T_g$ Region" is a typical vibration decay curve determined at a temperature below $T_g$. Damping provided at these temperatures is very small. The middle curve, labelled "$T_g$ Region," shows that damping is so high that essentially no oscillation occurs after the material returns from its initial perturbation when the polymer is heated to a temperature within the glass temperature region. This corresponds to a damping ratio of 1.0 or greater. The upper curve, labelled "Above-$T_g$ Region" shows decreased damping capability and a lower resonant frequency due to the decrease in stiffness of the PMMA when it is heated to a temperature above the $T_g$ region. That is, at temperatures above the $T_g$ region, the polymer becomes more rubbery. The "$T_g$ Region" curve was measured at 120° C. and the "Above-$T_g$ Region" curve was measured at 150° C. The "$T_g$ Region" for high-molecular-weight, amorphous (or only slightly crystalline) polymeric material such as employed in the device of this invention, is sometimes referred to as the brittle temperature, the critical temperature for the glassy state, or the second-order transition temperature.

Figure 3:
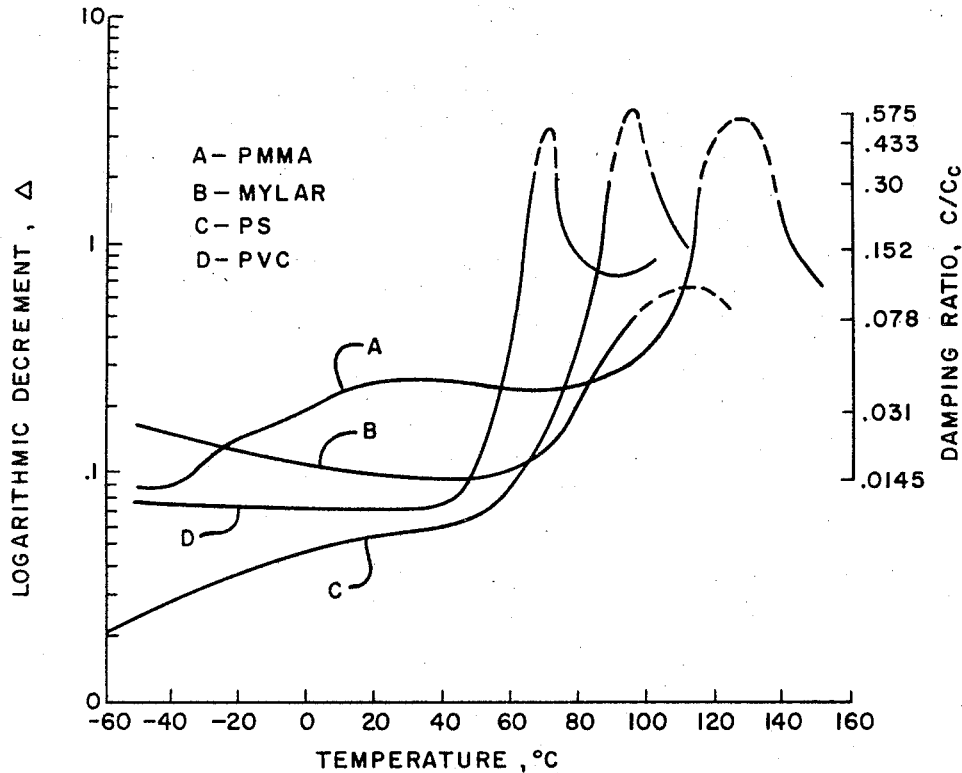
FIGURE 3 shows a plot of logarithmic decrements and damping ratios as a function of temperature for several polymers.

An indication of the magnitude of the $T_g$ region and the increase in damping which occurs in the region is seen from an examination of FIGURE 3 where logarithmic decrements, $\Delta$ and damping ratios $C/C_c$ are shown as a function of temperature for several different materials. The logarithmic decrement is the logarithm of the ratio of the amplitude of the successive free oscillations and commonly is used to indicate the degree of damping. The damping ratio is the ratio of $C/C_c$ where C is the viscosity of the damping material and $C_c$ is the critical viscosity. Four curves designated A, B, C and D are shown for poly(methyl methacrylate) (PMMA), polyethylene terephthalate (Mylar), polystyrene, and polyvinyl chloride, respectively. The dashed portion of the curves indicate that the damping ratios above about 0.4 could not be measured with the measuring apparatus employed. It will be seen that the temperature range of greatly increased damping is from 10° to 50° C. in extent for the different materials. The temperature range of greatly increased damping occurs within the glass transition temperature $T_g$ region of the material.

Figure 4:
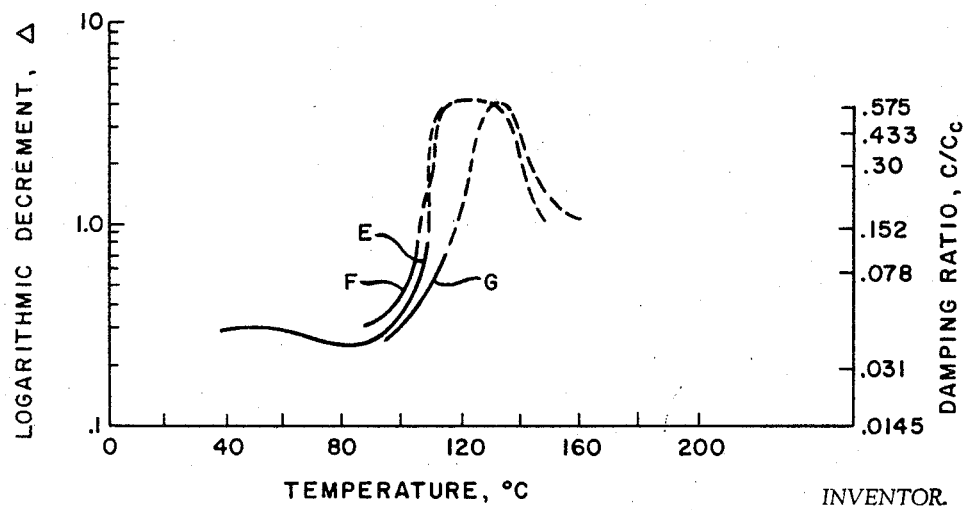
FIGURE 4 is similar to FIGURE 3 but shows a plot for lightly cross-linked polymers.

One limitation in the use of thermoplastic materials for use in isolators is that they tend to creep or slump after carrying a load at temperatures in the $T_g$ region. It is well known that cross-linking enhances the memory and return of the polymeric material to its original shape upon heating to a temperature above the $T_g$ region. Lightly cross-linked polymers have essentially the same damping behavior, as seen in FIGURE 4, wherein logarithmic decrement, $\Delta$ and damping ratio, $C/C_c$, are shown as functions of temperature for several lightly cross-linked materials. Three curves E, F and G are shown for materials synthesized from varying ratios of methyl methacrylate (MMA) and ethylene glycol dimethyacrylate (EDMA), a tri-functional monomer, which allows formation of cross-links. A chart of the materials, and their cross-link densities, is indicated below:

| Curve | Percent MMA | Percent EDMA | Cross-link densities, moles of network chain per ml.×$10^4$ |
|---|---|---|---|
| E | 99.75 | .25 | 1.48 |
| F | 99.00 | 1.00 | 4.83 |
| G | 94.00 | 6.00 | 7.59 |

The above indicated materials have cross-link densities in the range of commercially available products. Cross-linking raises slightly the glass transition temperature $T_g$. This feature can be used to advantage in the design of vibration isolators to provide optimum damping at a given temperature.

Figure 5:
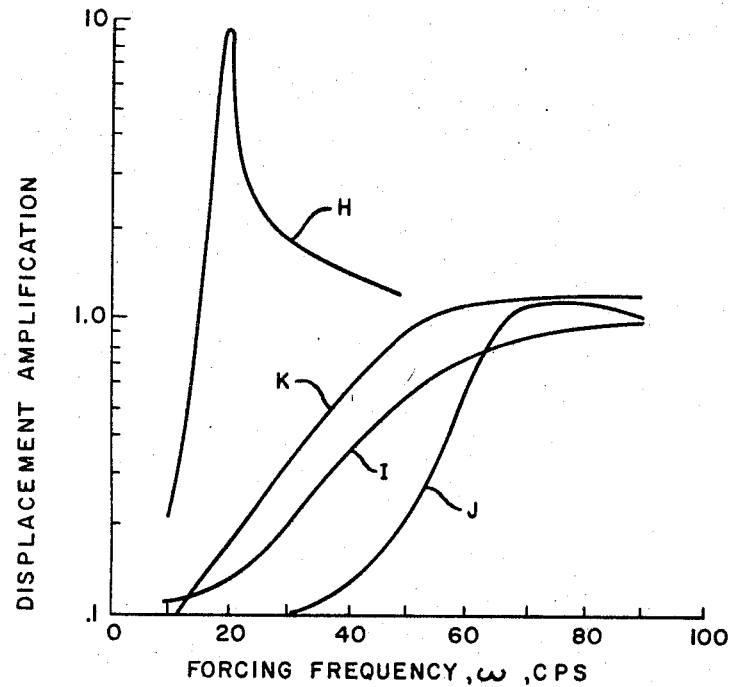
FIGURE 5 is a plot of displacement amplification versus forcing frequency for several polymers operated in their glass transition temperature range and for a prior art vibration isolator.

In FIGURE 5 displacement amplifications as a function of forcing frequency (in a forced-vibration system) are shown for a commercially available isolator (curve H) and for PVC at 87° C. (curve I), PMMA at 122° C. (curve J) and PMMA at 142° C. (curve K), the temperatures for the PVC and PMMA being within the glass temperature regions thereof. The displacement amplification is the ratio of the amplitude of the motion transmitted through the isolator to that of the disturbing motion. It will be seen that resonance for the commercial isolator, with a displacement amplification of about 9, occurred at about 20 c.p.s. Although not apparent from FIGURE 5, resonance for the PVC and PMMA occurred at frequencies varying from 30 to 55 c.p.s. with corresponding displacement amplifications of 0.3 to 0.4. Above the resonance point the displacement amplification approaches 1.0. It will be apparent that with the isolators of this invention good damping is provided at all frequencies, including the resonant frequency of the system, whereas with prior art isolators, vibration at the natural or resonant frequency of the system imposes severe loads on the system and usually must be avoided.

Figure 6:
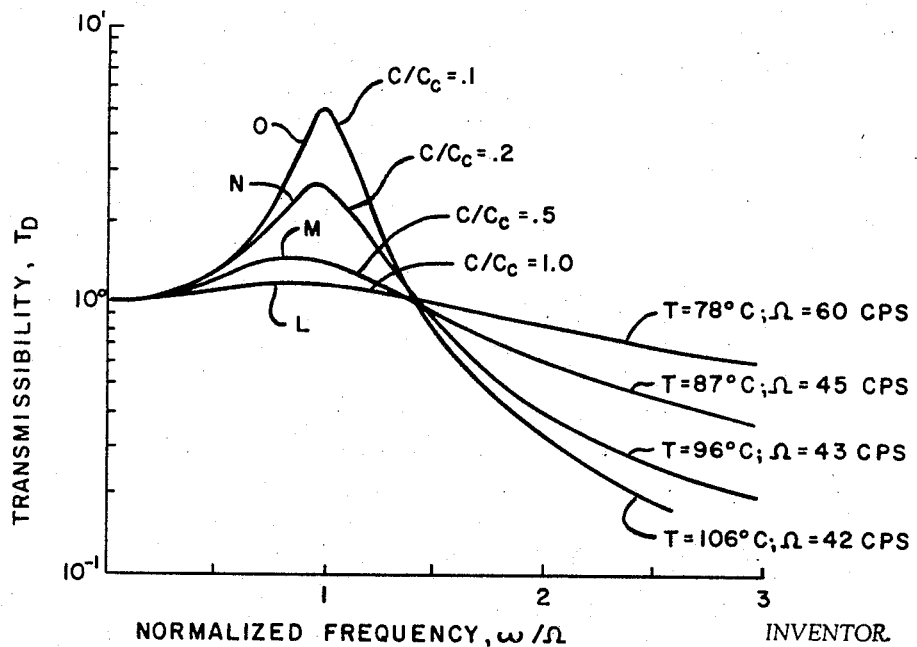
FIGURE 6 is a plot of transmissibility versus normalized frequency for several polymers operated in the glass transition temperature range.

In FIGURE 6 of the drawings transmissibilities of commercial polyvinyl chloride as a function of normalized frequency are shown for various temperatures in and above the glass transition region. Transmissibility, $T_D$, is defined by the following equation:

$$T_D = \sqrt{\frac{1+[2(\omega/\Omega)(C/C_c)]^2}{[1-(\omega^2/\Omega^2)]^2+[2(\omega/\Omega)(C/C_c)]^2}}$$

where $\omega/\Omega$ is the ratio of the frequency of the disturbing force to the undamped natural frequency of the system. Curves L, M, N and O are shown for temperatures at 78°, 87°, 96° and 106° C., respectively, as indicated. At temperatures of 78° and 87° C., which are in the $T_g$ region, the transmissibilities near resonance are of the order of 1.25 or less, which corresponds to a damping ratio of approximately 0.5 to 1.00. As the temperature is increased to above the glass transition region, to 96° and 106° C., the transmissibility increases because the material is then in its rubbery region. In the rubbery region the damping ratios are much lower than in the glass transition region.

As the stiffness of polymeric materials decreases with increasing temperature, and as the temperature of the damper of this invention may be controlled, the stiffness of the damper may be varied for control of the resonant frequency of the system. The stiffness is related to the resonant frequency in the following manner:

$$\Omega = \sqrt{\frac{k}{m}} = 3.13\sqrt{\frac{k}{w}}$$

where:

$\Omega$ = resonant frequency of the system,
$k$ = damper stiffness,
$m$ = mass of the body 20, and
$w$ = weight of the body 20.

Figure 7:
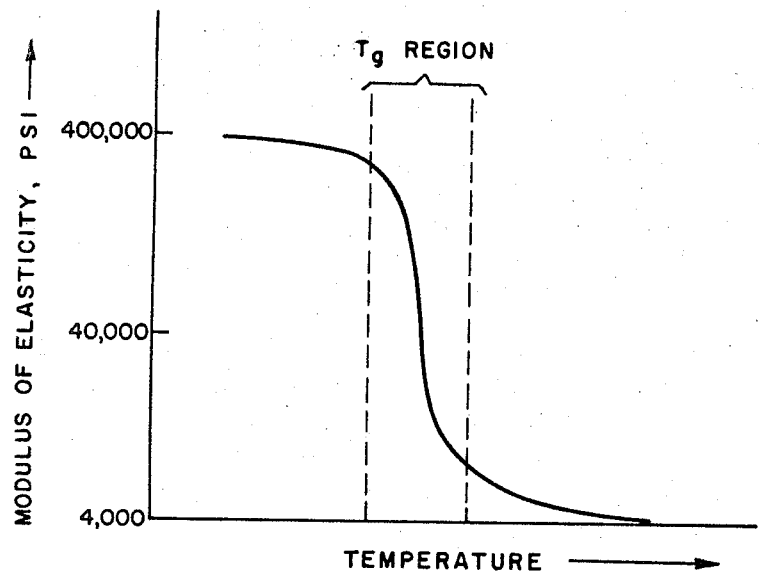
FIGURE 7 is a plot of the modulus of elasticity versus temperature for a typical amorphous polymer.

Consequently, "tuning" of the damper to achieve resonance at a specific frequency or to avoid resonance at a specific frequency by varying the temperature of the damper is possible. A plot of the modulus of elasticity as a function of temperature, including the $T_g$ region, for a typical amorphous polymer is shown in FIGURE 7.

In the glass transition temperature region, a high damping capability from 10 to 100 times greater than the capability of the material at either higher or lower operating temperatures is obtained. This high damping capability is generally sufficient to produce critical damping, that is, shock excitation will not cause oscillatory motion. If the temperature is variable, the damper may be operated at a temperature below the glass temperature whereby it will serve as a rigid mount. At a later time, when damping is required, the temperature may be raised to provide high and efficient damping. Another unique feature of the damper of this invention is that if the damper is used in the temperature range below $T_g$, an increase in temperature produces an increased damping capability which serves as a safety factor. This is the opposite of most damping systems in which an increase in temperature causes a decrease in damping capability.

The invention having been described in detail in accordance with the requirements of the Patent Statutes, various other changes and modifications may suggest themselves to those skilled in this art. For example, a polymer may be used which has a $T_g$ region corresponding to the application temperature of the damper, in which case no heating means would be required. Also, since the glass temperature is affected by the molecular weight, by copolymerization, by the extent of cross-linking, and by plasticization, one or more of those factors may be controlled to obtain a damper material with the desired $T_g$ region.

I claim:
1. A vibration damping device for vibration isolation of first and second relatively movable parts comprising,
a solid plastic member having a glass transition temperature region characterized by increased softness and viscosity,
means for connecting said first and second relatively movable parts to said plastic member, and
means for increasing the damping capability of said device, said means comprising means for heating said plastic member to said glass transition temperature region.

2. The vibration damping device as defined in claim 1 wherein said heating means comprises a heating element, and means for connecting the heating element to a voltage source.

3. The vibration damping device as defined in claim 1 wherein said heating means is embedded in the plastic member.

4. A vibration damping device for vibration isolation of first and second movable parts comprising,
a solid, high-molecular-weight, substantially amorphous polymer member having a glass transition temperature region characterized by increased softness and viscosity of the polymer,
means for connecting said first and second relatively movable parts to said polymer member, and
means for varying the viscosity of said polymer member, the damping capability of said device being a function of said plastic member viscosity.

5. The vibration damping device as defined in claim 4 wherein the means for varying the viscosity of said polymer member comprises means for varying the temperature thereof, the polymer temperature being variable between a temperature outside the glass transition temperature region and a temperature in the glass transition temperature region, said device having substantially increased damping capability in said glass transition temperature region.

6. A tunable vibration damping device for vibration isolation of first and second bodies comprising,
a solid, high-molecular-weight, substantially amorphous polymer member having a glass transition temperature region,
said polymer member being coupled between said first body and said second body, said bodies being movable with respect to each other,
said bodies and polymer member forming a system having a resonant frequency of motion,
means for varying the resonant frequency,
said frequency varying means comprising means for varying the temperature and the viscosity of said plastic member, and
said viscosity increasing and said resonant frequency decreasing as said polymer member temperature is increased toward said glass transition temperature region.

References Cited

UNITED STATES PATENTS

| | | | |
|---|---|---|---|
| 3,037,764 | 6/1962 | Paulsen | 267—63 |
| 3,146,980 | 9/1964 | MacGregor | 248—20 |
| 3,219,305 | 11/1965 | Chartet | 248—358 |
| 3,223,400 | 12/1965 | Deister | 248—18 XR |

ROY D. FRAZIER, *Primary Examiner.*

J. FRANKLIN FOSS, *Assistant Examiner.*

U.S. Cl. X.R.

248—22, 358; 267—1